United States Patent [19]

Takei et al.

[11] Patent Number: 4,927,345

[45] Date of Patent: May 22, 1990

[54] PRESS CYLINDER FOR HIGH-TEMPERATURE, HIGH-PRESSURE PRESSING MACHINE

[75] Inventors: Makoto Takei, Nishinomiya; Mamoru Tamura, Hirakata, both of Japan

[73] Assignee: Ohwada Carbon Industrial Co., Ltd., Osaka, Japan

[21] Appl. No.: 316,416

[22] Filed: Feb. 27, 1989

[30] Foreign Application Priority Data

Mar. 3, 1988 [JP] Japan .................................. 63-50937

[51] Int. Cl.[5] .......................... G01N 1/06; A01N 1/00

[52] U.S. Cl. ............................................ 424/4; 424/3; 424/75; 422/40

[58] Field of Search ......... 425/77, 406, 407, DIG. 26; 100/295, 299; 266/249

[56] References Cited

U.S. PATENT DOCUMENTS

| | | | |
|---|---|---|---|
| 3,149,374 | 9/1964 | Wagner | 425/DIG. 26 |
| 3,245,118 | 4/1966 | Smith | 425/77 |
| 3,577,590 | 5/1971 | Dawson et al. | 425/77 |
| 3,647,331 | 3/1972 | Kuratomi | 425/77 |
| 3,650,646 | 3/1972 | Kirkpatrick et al. | 425/77 X |
| 3,895,894 | 7/1975 | Biermann et al. | 425/77 |
| 4,021,171 | 5/1977 | Shulzhenko et al. | 425/DIG. 26 |
| 4,225,300 | 9/1980 | Latter | 425/77 |
| 4,460,323 | 7/1984 | Toplicescu | 425/406 X |
| 4,629,412 | 12/1986 | Inoue et al. | 425/DIG. 26 |

FOREIGN PATENT DOCUMENTS

| | | | |
|---|---|---|---|
| 613273 | 1/1961 | Canada | 425/DIG. 26 |

*Primary Examiner*—Richard L. Chiesa
*Attorney, Agent, or Firm*—Joseph W. Farley

[57] ABSTRACT

The invention relates to a press cylinder for a high-temperature, high-pressure pressing machine for use in sinter molding ceramics, hard metals, and the like. An outer casing constructed of a carbon fiber reinforced carbon composite and an inner casing constructed of a heat resistant material are fitted together. The inner casing is formed with a longitudinally extending slit which meets given conditions. A gap which meets given conditions is formed between the outer casing and the inner casing. Because of the presence of the slit and the gap, no substantial stress is liable to be exerted on the outer and inner casings which are different in thermal expansion coefficient. Therefore, the outer and inner casing are not liable to fracture or plastic deformation.

7 Claims, 3 Drawing Sheets

PRESS CYLINDER FOR HIGH-TEMPERATURE, HIGH-PRESSURE PRESSING MACHINE

FIELD OF THE INVENTION

This invention relates to a press cylinder for high-temperature, high-pressure pressing machines for use in sinter molding ceramics, hard metals, and the like under high-temperature, high-pressure conditions.

BACKGROUND OF THE INVENTION

Conventionally, a high-temperature, high-pressure pressing machine employed in producing special ceramics and hard metals has a press cylinder. The press cylinder has a pad, an artificial graphite-made outer casing placed on the pad, an artificial graphite-made inner casing, generally known as a sleeve, fitted in the outer casing in contact with the inner periphery of the outer casing, a pair of artificial graphite-made press plates fitted in the inner casing, and a press bar fitted in the inner casing. One of the press plates is placed on the pad, and the other press plate which is placed above the one press plate is pressed by the press bar from above. In sinter molding ceramics and hard metals by such high-temperature, high-pressure pressing machine, the material to be sinter molded is loaded between the two press plates, and same is pressed by the press bar under a pressure of more than 100 kg/cm$^2$ under vacuum or in a non-oxidizable atmosphere, such as argon or nitrogen, then heated to more than 1000° C. by induction heating or electric resistance heating using an artificial carbon material. The inner casing may be discarded and replaced by a new one if sintered ceramics and/or metals have deposited on its inner wall, whereby ceramic/-metal depositions on the inner periphery of the outer casing is prevented so as to permit prolonged use of the outer casing.

Hitherto, no material other than artificial graphite has been available which can withstand high pressure at high temperatures of more than 1000° C. Recently, however, there are needs for a high-temperature, high-pressure pressing machine which can withstand still higher pressure conditions. In order to meet the needs, it has been proposed to increase the wall thickness of the artificial graphite-made outer casing. However, such approach is still insufficient to provide the desired strength characteristics, and if the desired strength is to be met, the wall thickness must be considerably increased, which naturally means increased weight or inconvenience in handling, and decreased internal space or decreased capacity for housing the material to be sinter molded, that is, lower efficiency.

Attempts have been made to overcome this problem by using a carbon fiber reinforced carbon composite (hereinafter referred to as CRC), a recently developed material, for the outer casing of a press cylinder in a pressing machine of the above mentioned type. This material, CRC, is lower in specific gravity and has several times higher bending, tensile, and impact strength characteristics than artificial graphite material of the conventional type. Furthermore, it exhibits remarkably better high-temperature characteristics in a non-oxidizable atmosphere than other materials. For these reasons it is used for missile and rocket parts, aircraft brakes, and the like.

Fabrication of a cylindrical outer casing using CRC is usually carried out according to the following procedure. Carbon filaments impregnated with a phenolic, epoxy, or furan resin are wound on a metallic cylinder of a specified diameter to the desired width (or length of the outer casing) and thickness, and same is subjected to the step of hardening reaction at temperatures of 100° C. to 200° C. Then, the metallic cylinder is removed to give a cylindrical body, which is then calcined at a temperature of more than 1000° C. Subsequently, steps of impregnation with the phenolic, epoxy, or furan resin and calcination are repeated several times.

The circumferential tensile strength of a CRC cylindrical body is of the order of 2500 kg/cm$^2$ or about ten or more times that of a conventional artificial graphite material. Now, the strength of an outer casing of a press cylinder of a high-temperature, high-pressure pressing machine and the internal pressure to which it can withstand have a relationship expressed by the following equation, and where the outer casing has a higher circumferential tensile strength, a higher internal pressure can be applied:

$$\delta t max = P(\gamma 1^2 + \gamma 2^2)/(\gamma 1^2 - \gamma 2^2)$$

(where δt: circumferential tensile strength, P: internal pressure, γ1: outer radius, γ2: inner radius) Therefore, by employing a CRC outer casing it is possible to carry out sinter molding of ceramics or alloys under high-temperature, high-pressure conditions by applying a higher pressure than in the case of a conventional high-temperature, high-pressure pressing machine. Accordingly, it is known that use of such outer casing provides various advantages: that a higher density sintered material can be obtained; and that the wall thickness of the outer casing can be reduced, which means light weight, increased inner diameter, increased capacity, and increased productivity.

However, the coefficient of linear expansion of CRC is smaller than that of conventional artificial graphite material. Therefore, when an artificial graphite-made inner casing fitted in a CRC outer casing, and two press plates and a press bar are subjected to dimensional increase as a result of thermal expansion under a temperature rise, compressive stress is exerted on the CRC outer casing which is less subject to thermal expansion and, if such compressive stress exceeds a certain limit, the CRC outer casing may become fractured. Another trouble is that the outer casing is subject to plastic deformation under the compressive stress and, as a result, the outer casing diametrically expands, so that when the outer casing is reused, an increased gap caused between it and the inner casing will hamper precision working. As such, despite the aforesaid advantages of CRC, attempts to use a CRC outer casing have been unsuccessful.

DISCLOSURE OF THE INVENTION

This invention is directed to solving the foregoing problem, and accordingly it is an object of the invention to provide a press cylinder for a high-temperature, high-pressure pressing machine which employs an outer casing made of CRC and yet is not liable to outer casing fracture due to a thermal expansion difference between the outer casing and other components, such as inner casing, press plates, and press bar, made of such heat resistant material as artificial graphite material.

In order to accomplish the foregoing object, the press cylinder for a high-temperature, high-pressure pressing machine in accordance with the invention comprises: an outer casing made of a carbon fiber reinforced carbon composite, an inner casing made of a heat resistant material and formed with a longitudinally extending slit of the width (A) expressed by equation (I) which is fitted in the outer casing with a fitting gap (B) expressed by equation (II), two press plates made of a heat resistant material and fitted in the inner casing, and a press bar made of a heat resistant material and fitted in the inner casing:

$$A=\alpha\cdot T\cdot D\cdot\pi\cdot(C_2-C_1) \quad (I)$$

$$B=\beta\cdot T\cdot D\cdot(C_2-C_1) \quad (II)$$

(where A: slit width in mm, B: fitting gap in mm, $\alpha$: $0.05\sim2.0$, $\beta$: $0.1\sim2.0$, T: temperature °C., D: outer diameter of the inner casing in mm, $C_1$: coefficient of linear expansion of the carbon fiber reinforced carbon composite of which the outer casing is made, and $C_2$: coefficient of linear expansion of the heat resistant material of the inner casing.)

In the press cylinder according to the invention, the inner periphery of the inner casing is sloped at an angle of not more than 15 degrees, said press cylinder has an auxiliary inner casing made of a heat resistant material which is fitted between the inner casing and the press plates and between the inner casing and the press bar, the auxiliary inner tube has an outer periphery sloped contrary to the inner periphery of the inner tube and held in contact with said inner periphery, and at least one slit formed in the longitudinal direction thereof.

Carbon fibers useful for the carbon fiber reinforced carbon composite of which the outer casing is formed may be any kind of carbon fiber or graphite fiber. Acrylonitrile, rayon, pitch, lignin fibers, or thermosetting resin-based carbon fibers may be used as well. The carbon fibers are used in the form of long filament, chopped strand, two-dimensional or three-dimensional fabric, or non-woven fabric. CRC is produced by repeating the steps of thermosetting resin impregnation and calcination with respect to above said form of carbon fibers several times. The thermosetting resin used for this purpose may be made of, for example, phenolic resins, epoxy resins, fran resins, and polyimide resins.

A preferred procedure for molding of a CRC outer casing is: carbon filaments, such as pitch or acrylonitrile filaments, are impregnated with a phenolic or the like resin; the so impregnated filaments are wound onto a metallic cylinder of a specified diameter to the desired width and thickness; same is hardened at temperatures of 100° C. to 200° C.; the metallic cylinder is removed to give a cylindrical body; then the cylindrical body is calcined at temperatures of 700° C. or more; and subsequently steps of impregnation with phenolic or the like resin and calcination are repeated several times. The proportion of the carbon fibers in CRC is preferably 40% or more.

Generally, CRC varies in linear expansion coefficient according to the production method employed, and its linear expansion behavior is anisotropic on the basis of the anisotropism of its structure. This linear expansion coefficient is substantially of same order as that of ordinary carbon materials in a direction perpendicular to carbon fibers, but in the direction of the carbon fiber orientation it is $1\sim3\times10^{-6}$/°K., or $20\sim50$% smaller as compared with the linear expansion coefficient of an artificial graphite material.

For the heat resistant material of which the inner casing, auxiliary inner casing, press plate and press bar are formed, artificial graphite materials, artificial carbon materials, CRC, ceramics, or the like may be used, but from the standpoints of heat resistance and strength, artificial graphite materials are preferred. For the raw material for artificial graphite material, pitch cokes, petroleum cokes, hard cokes, or the like may be used. Generally, the artificial graphite material is produced by mixing a filler, such as cokes, and a binder, such as pitch, molding the mixture by extrusion or casting, then calcining. Often, a high temperature treatment known as graphitization is carried out. The linear expansion coefficient of the artificial graphite produced in this way has an anisotropy. Where the artificial graphite material is produced by extrusion, its linear expansion coefficient is about 50% smaller in the direction of extrusion than in the direction perpendicular to that direction, and where it is produced by casting, its linear expansion coefficient is about 50% smaller in the direction perpendicular to the direction of pressure application than in the direction of pressure application. Recently, however, artificial graphite materials having isotropy are produced by applying pressure uniformly from outer sides. Artificial graphite materials produced in this way have no directional property for linear expansion coefficient or electrical and mechanical strength, and accordingly thay are suitable for use in manufacturing high-temperature, high-pressure pressing machines. Generally, the linear expansion coefficient of artificial graphite material varies according to the temperature as shown, by way of example, in Table 1.

TABLE 1

| Temperature (°C.) | Linear expansion coefficient ($\times10^{-6}$/°K.) |
|---|---|
| 100 | 4.0 |
| 500 | 4.7 |
| 1000 | 5.3 |
| 1500 | 5.7 |
| 2000 | 6.1 |

An inner casing having slits of a width A expressed by equation (I) is fitted in the outer casing with a fitting gap B expressed by equation (II). For value $(C_2-C_1)$ in equations (I), (II), it is preferable to apply the maximum value under the operating conditions, but a value under the maximum operating temperature conditions may be used. T represents an operating temperature; preferably it should be maximum operating temperature. For $\alpha$, $\beta$, values are suitably selected according to the compressive strength of the heat resistance material used for the inner casing. Where the material has high compressive strength, the values may be lower than 1, but generally they are 1 or about 1.

For the purpose of fitting in the inner casing an auxiliary inner casing provided with at least one longitudinal silt, the inner periphery of the inner casing should be sloped at an angle of 15 degrees or less. The auxiliary casing, whose outer periphery has a slope contrary to that of the inner periphery of the inner casing, is fitted in the inner casing in abutment relation with the inner periphery of the inner casing. Such way of fitting facilitates mounting and removal of the auxiliary inner casing. If the angle of the slope is more than 15 degrees, the wall thickness of the inner casing and that of the auxiliary inner casing may be partially excessively thin, which may lead to breakage.

The auxiliary inner casing has at least one slit. It may have two or more of such slits, in which case the auxiliary inner casing has two or more partitions. When fitting the auxiliary inner casing in the inner casing, it is desirable that positioning should be made so as not to allow the slit of the inner casing to coincide with the slit of the auxiliary inner casing. The inner periphery of the auxiliary inner casing is liable to deposition of sintered waste thereon and may become unusable after several times of use. To avoid such inconvenience, the auxiliary inner casing may be longitudinally divided into, for example, three segments so that only the segment in which sintered waste is present can be replaced.

In the press cylinder according to the invention, the material to be sinter molded is loaded between two press plates inside the inner casing or the auxiliary inner casing and is subjected to heating and pressing. For the purpose of fitting the press plates in the inner casing or auxiliary inner casing, it is preferred that usually a gap of 0.1 to 0.2 mm should be provided. The press bar is required to have high strength, and for this purpose it is often formed of CRC.

Constructed as above described, the press cylinder for a high-temperature, high-pressure pressing machine in accordance with the invention is not liable to a substantial compressive stress with respect to its outer casing, inner casing, and auxilary inner casing, because any thermal expansion difference arising from a combination of different materials can be absorbed by the slit or slits having the specified width A and the predetermined fitting gap B. Therefore, its components, such as outer casing, inner casing, and auxiliary inner casing, are not subject to fracture or plastic deformation.

DESCRIPTION OF THE PREFERRED EMBODIMENTS

Figure 1:
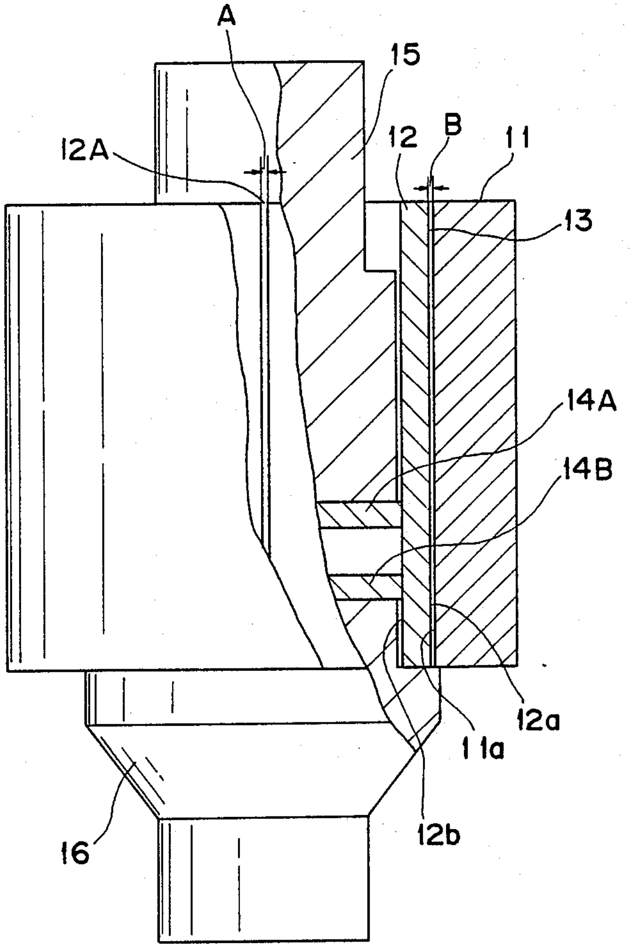
FIG. 1 is a partially cutaway front view showing principal parts of a press cylinder for a high-temperature, high-pressure pressing machine representing a first embodiment of the invention.

FIG. 1 illustrates a press cylinder for a high-temperature, high-pressure pressing machine representing a first embodiment of the invention. In FIG. 1, a cylindrical inner casing 12 formed of a heat resistant material is fitted in the interior of a vertically cylindrical outer casing 11 constructed of CRC. The inner casing 12 has a longitudinally extending slit 12A formed therein with a specified width A expressed by the foregoing equation (I) and is fitted in the interior of an outer casing 11 with a gap or clearance 13 between the inner periphery 11*a* of the outer casing 11 and the outer periphery 12*a* of the inner casing 12, the clearance 13 corresponding to the fitting gap B specified by the foregoing equation (II). In the interior of the inner casing 12 there are disposed two press plates 14A, 14B, upper and lower, in opposed relation, the press plates 14A, 14B being formed of a heat resistant material, and above the upper press plate 14A there is disposed a press bar 15 constructed of a heat resistant material. Shown by 16 is a pad.

In the press cylinder for a high-temperature, high-pressure pressing machine shown in FIG. 1, a material to be sinter molded is placed between the two press plates 14A, 14B and the inner periphery 12*b* of the inner casing 12, and the material is heated by induction heating or electric resistance heating and pressed by the press bar 15, whereby it is sinter molded. In this operation, any thermal expansion difference, during heating, between the outer casing 11 constructed of CRC, a material having a smaller linear expansion coefficient, and the inner casing 12 constructed of a heat resistant material having a linear expansion coefficient larger than that of CRC, can be completely absorbed because the inner casing 12 has a longitudinally extending slit 12A formed therein with the width A, and because the inner casing 12 is fitted in the outer casing 11 with the clearance 13 of the specified fitting gap size B therebetween. Therefore, the outer casing 11 and inner casing 12 are not liable to fracture or plastic deformation due to heating or pressing.

Figure 2:
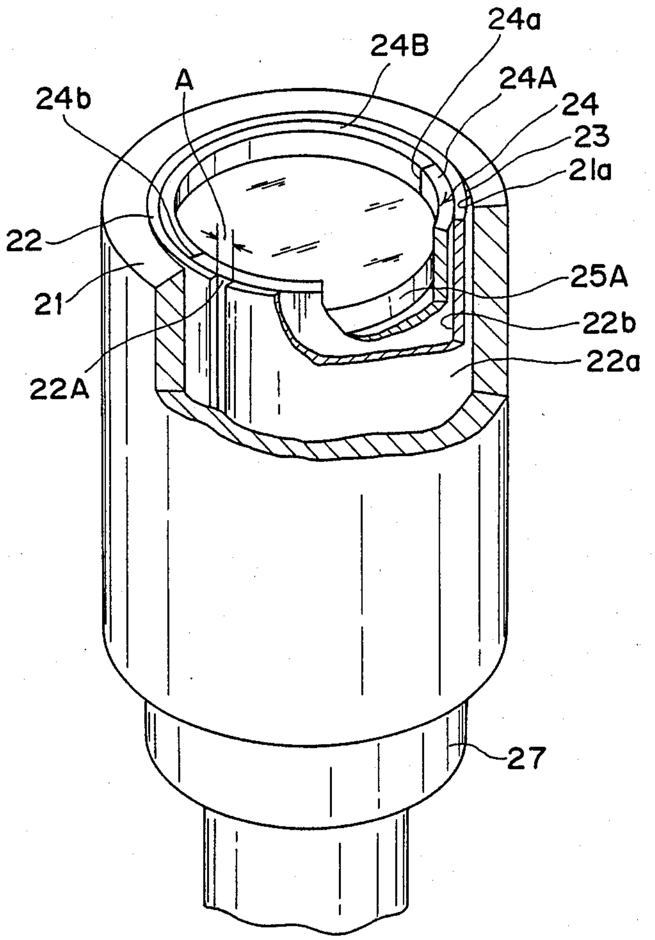
FIG. 2 is a partially cutaway perspective view showing principal parts of a press cylinder for a high-temperature, high-pressure pressing machine representing a second embodiment of the invention.
Figure 3:
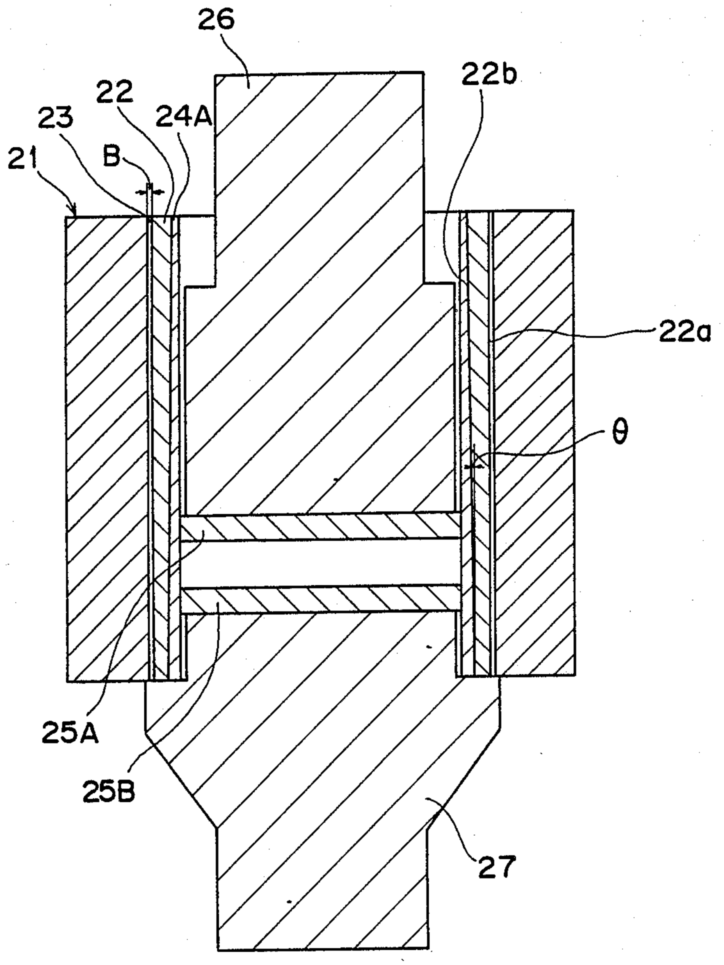
FIG. 3 is a longitudinal sectional view of the press cylinder for a high-temperature, high-pressure pressing machine shown in FIG. 2.

FIGS. 2 and 3 illustrate a press cylinder for a high-temperature, high-pressure pressing machine representing a second embodiment of the invention. In FIGS. 2 and 3, a cylindrical inner casing 22 constructed of a heat resistant material is fitted in the interior of a cylindrical outer casing 21 constructed of CRC. This inner casing 22 has a slit 22A of a width A specified by the equation (I) which is formed in the longitudinal direction of the inner casing 22, and between the inner periphery 21*a* of the outer casing 21 and the outer periphery 22*a* of the inner casing 22 there is provided a clearance 23 of a fitting gap size B specified by the foregoing equation (II). Further, the inner periphery 22*b* of the inner casing 22 is sloped at an inclination angle $\theta$ of 15 degrees or less so as to give a larger wall thickness to an upper portion of the inner casing 22. In contact with the so sloped inner periphery 22*b* of the inner casing 22, an auxiliary inner casing 24 having an oppositely sloped outer periphery corresponding to the sloped inner periphery of the inner casing 22 is fitted in the inner casing 22, the auxiliary inner casing 24 being constructed of a heat resistant material and so configured as to give its upper portion a reduced wall thickness. This auxiliary inner casing 24 has two slits 24*a*, 24*b* formed in the longitudinal direction thereof. The auxiliary inner casing 24 is divided into halves in the peripheral direction, thus consisting of two semi-cylindrical parts 24A, 24B. The two semi-cylindrical parts 24A, 24B are fitted in the inner casing 22 by being so peripherally positioned that their mating portion will not coincide with the slit 22A of the inner casing 22. Inside the auxiliary inner casing 24 there are disposed two press plates 25A, 25B, upper and lower, in opposed relation, the press plates 25A, 25B being formed of a heat resistant material, and above the upper press plate 25A there is disposed a press bar 26 constructed of a heat resistant material. Shown by 27 is a pad.

In the press cylinder for a high-temperature, high-pressure pressing machine shown in FIGS. 2 and 3, a material to be sinter molded is loaded between the press plates 25A, 25B and the inner periphery of the auxiliary inner casing 24, and the material is heated by induction heating or resistance heating and pressed by the press bar 26, whereby the material is sinter molded. In this operation, any linear expansion difference, during heating, between the outer casing 21 constructed of CRC, a material having a smaller linear expansion coefficient, and the inner casing 22 and auxiliary inner casing 24 constructed of a heat resistant material having a greater linear expansion coefficient than CRC can be completely absorbed because the inner casing 22 has a slit 22A of width A formed in its longitudinal direction as is fitted in the outer casing 21 with a clearance 23 corresponding to the fitting gap B, and because the auxiliary inner casing 24 has two parting lines (mating positions). Therefore, the inner casing 22 and auxiliary inner casing 24 are not liable to fracture of plastic deformation. Further, because the auxiliary inner casing 24 is fitted in the interior of the inner casing 22, it is possible to prevent the material being processed from flowing out from the slit 22A of the inner casing 22 to deposit on the inner periphery 21*a* of the outer casing 21. When the auxiliary inner casing 24 is to be fitted in or removed from the inner casing 22, such fitting and removal can be easily carried out because their respective portions at which they are fitted together are sloped at an angle of $\theta$.

Now, the following examples are given to further describe the present invention.

EXAMPLE 1

A press cylinder for a high-temperature, high-pressure pressing machine as shown in FIG. 1 was fabricated in the following way. Polyacrylonitrile carbon long filaments were impregnated with a phenolic resin, and the so impregnated filaments were wound on a metallic cylinder at an angle of 45 degrees. Heat treatment at 150° C. was carried out for 10 hours to harden the filaments. Then, same was calcined at 2000° C. Subsequently, steps of phenolic resin impregnation and calcination were repeated three times. Thus, a cylindrical outer casing 11 formed of a CRC having a linear expansion coefficient of $3\times10^{-6}$/°K., of 100 mm in outer diameter, 80 mm in inner diameter, 50 mm in length, was obtained. An inner casing 12 having an outer diameter of 79.6 mm, an inner diameter of 75 mm, and a longitudinally extending slit 12A, 0.4 mm in width, was prepared using an artificial graphite having a specific gravity of 1.68, a linear expansion coefficient of $5\times10^{-6}$/°K., and a compressive strength of 450 kg/cm$^2$. This inner casing 12 was fitted in the outer casing 11 obtained as above (with a fitting gap of 0.4 mm). Two press plates 14A, 14B, each having a diameter of 74.9 mm and a thickness of 10 mm, constructed of the foregoing artificial graphite material, and a press bar 15 constructed of same material, were fitted in the interior of the inner casing 12 and the assembly was mounted on a pad 16.

A material to be sinter molded was loaded between the press plates 14A and 14B of the press cylinder and subjected to a pressure of 20 ton by the press bar 15. Temperature was raised to 2000° C. and sinter molding was carried out. Subsequently, the cylinder was cooled to room temperature and disassembled. No fracture or nothing else abnormal was observed with any of the outer casing 11, inner casing 12, press plates 14A, 14B, and press bar 15. The desired sintered product was successfully obtained.

COMPARATIVE EXAMPLE 1

An inner casing having an outer diameter of 79.98 mm, an inner diameter of 75 mm, and a length of 55 mm, constructed of same artificial graphite material as used in Example 1 was fitted in the interior of an outer casing constructed in same way as in Example 1. After heated up to 2000° C., the inner casing was removed and found to have been fractured.

COMPARATIVE EXAMPLE 2

In same manner as in Example 1 a similar CRC made outer casing having an outer diameter of 100 mm, an inner diameter of 93 mm, and a length of 50 mm was prepared. In the interior of this outer casing was fitted an inner casing having an outer diameter of 92.99 mm and a length of 50 mm, formed of same artificial graphite material as used in Example 1. These were heated up to 2000° C., and then cooled down to 20° C. Since the outer casing was of thin wall thickness, no fracture was observed with both the outer casing and the inner casing. However, the outer diameter of the outer casing was found to have been increased to 100.2 mm, proving that plastic deformation had taken place.

EXAMPLE 2

A press cylinder for a high-temperature, high-pressure pressing machine as shown in FIG. 2 was constructed in the following way. A cylindrical outer casing 21 having an outer diameter of 370 mm, an inner diameter of 305 mm, and a length of 450 mm was formed in same way as in Example 1 by using a CRC having a linear expansion coefficient of $3\times10^{-6}$/°K. An inner casing 22 having an outer diameter of 304.2 mm, an inner diameter of 285 mm at one end and an inner diameter of 295 mm at the other end, its inner periphery being sloped at an inclination angle of 40 minutes, and a longitudinally extending slit 22A with a width of 2.6 mm, was constructed of a graphite material having an apparent specific gravity of 1.81, a linear expansion coefficient of $6\times10^{-6}$/°K., and a compressive strength of 400 kg/cm$^2$. The inner case 22 was fitted in the outer casing 21 (with a fitting gap of 0.8 mm). An auxiliary inner casing 24 having an inner diameter of 275.05 mm and a length of 450 mm, formed of the foregoing graphite material, and having an outer periphery closely adjoining the sloped surface of the inner periphery of the inner casing 22 was fitted in the inner casing 22, the auxiliary inner casing 24 being divided into two halves. In the interior of the auxiliary inner casing 24 were fitted two press plates 25A, 25B, each having a diameter of 274.9 mm and a thickness of 20 mm, formed of aforesaid artificial graphite material, and a press bar 26 formed of same artificial graphite material. The assembly was mounted on a pad 27. Fitting of the inner casing 22 and the auxiliary inner casing 24 was effected in such a way that the slit 22A of the inner casing 22 will not coincide with the meshing part of the two halves, i.e., semi-cylindrical portions 24A, 24B, of the auxiliary inner casing 24.

A material to be sinter molded was loaded between the two press plates 25A, 25B of the press cylinder, and subjected to a pressure of 150 ton by the press bar 26. Temperature was raised to 2000° C. and the material was sinter molded. Subsequently, the cylinder was cooled to room temperature and disassembled. No fracture or on other abnormal occurrence was observed with any of the outer casing 21, inner casing 22, auxiliary inner casing 24, press plates 25A, 25B, and press bar 26. The desired sintered product was successfully obtained.

What is claimed is:

1. A press cylinder for a high-temperature, high-pressure pressing machine, comprising:

an outer casing made of a carbon fiber reinforced carbon composite, an inner casing made of a heat resistant material and formed with a longitudinally extending slit of a width (A) expressed by equation (I) which is fitted in the outer casing with a fitting gap (B) therebetween expressed by equation (II), two press plates made of a heat resistant material and fitted in the inner casing, and a press bar made of a heat resistant material and fitted in the inner casing, wherein equation (I) is $$A=\alpha\cdot T\cdot D\cdot\pi\cdot(C_2-C_1)$$

and equation (II) is $$B=\beta\cdot T\cdot D\cdot(C_2-C_1)$$

where A: slit width in mm, B: fitting gap in mm, $\alpha$: 0.05~2.0, $\beta$: 0.1~2.0, T: temperature °C., D: outer diameter of the inner casing in mm, $C_1$: coefficient of linear expansion of the carbon fiber reinforced carbon composite of which the outer casing is made, and $C_2$: coefficient of linear expansion of the heat resistant material of the inner casing.

2. A press cylinder for a high-temperature, high-pressure pressing machine as set forth in claim 1 wherein:

the inner periphery of the inner casing is sloped at an angle of not more than 15 degrees, said press cylinder has an auxiliary inner casing made of a heat resistant material which is fitted between the inner casing and the press plates and between the inner casing and the press bar, the auxiliary inner casing has an outer periphery sloped contrary to the inner periphery of the inner casing and held in contact with said inner periphery, and at least one parting line formed in the longitudinal direction thereof.

3. A press cylinder for a high-temperature high-pressure pressing machine as set forth in claim 2 wherein said auxiliary inner casing comprises two half-casings.

4. A press cylinder for a high-temperature, high-pressure pressing machine as set forth in claim 1 wherein the carbon fiber reinforced carbon composite is a material selected from the group consisting of carbon fiber and graphite fiber.

5. A press cylinder for a high-temperature, high-pressure pressing machine as set forth in claim 1 wherein the carbon fiber reinforced carbon composite is a material selected from the group consisting of acrylonitrile, rayon, pitch, lignin, and thermosetting resin carbon fibers.

6. A press cylinder for a high-temperature, high-pressure pressing machine as set forth in claim 1 wherein the carbon fiber reinforced carbon composite is a material selected from the group consisting of long filament, chopped strand, two-dimensional fabric, three-dimensional fabric, and non-woven fabric.

7. A press cylinder for a high-temperature, high-pressure pressing machine as set forth in claim 1 wherein the heat resistant material of the inner casing, the press plates, and the press bar is a material selected from the group consisting of artificial graphite material, artificial carbon material, artificial carbon reinforced carbon composite, and ceramics.

* * * * *

UNITED STATES PATENT AND TRADEMARK OFFICE

CERTIFICATE OF CORRECTION

PATENT NO. : 4,927,345

DATED : May 22, 1990

INVENTOR(S) : Makoto Takei et al.

It is certified that error appears in the above-identified patent and that said Letters Patent is hereby corrected as shown below:

Column 8, line 61, "on" should read --no--

Signed and Sealed this

Twenty-ninth Day of October, 1991

*Attest:*

HARRY F. MANBECK, JR.

*Attesting Officer*

*Commissioner of Patents and Trademarks*